US010439874B2

(12) United States Patent
White, Jr. et al.

(10) Patent No.: US 10,439,874 B2
(45) Date of Patent: Oct. 8, 2019

(54) TRACKING AND IMPLEMENTING WORKAROUNDS TO COMPUTER-RELATED ISSUES

(71) Applicant: Cisco Technology, Inc., San Jose, CA (US)

(72) Inventors: David C. White, Jr., St. Petersburg, FL (US); Jay Kemper Johnston, Raleigh, NC (US); Magnus Mortensen, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 290 days.

(21) Appl. No.: 15/620,100

(22) Filed: Jun. 12, 2017

(65) Prior Publication Data

US 2018/0359142 A1 Dec. 13, 2018

(51) Int. Cl.
*G06F 15/16* (2006.01)
*H04L 12/24* (2006.01)
*H04L 29/08* (2006.01)
*H04L 12/26* (2006.01)

(52) U.S. Cl.
CPC ........ *H04L 41/082* (2013.01); *H04L 41/0816* (2013.01); *H04L 43/045* (2013.01); *H04L 67/12* (2013.01); *H04L 67/22* (2013.01); *H04L 67/34* (2013.01); *H04L 41/0636* (2013.01)

(58) Field of Classification Search
CPC . H04L 41/082; H04L 41/0816; H04L 43/045; H04L 67/12; H04L 67/22; H04L 67/34; H04L 41/0636
See application file for complete search history.

(56) References Cited

U.S. PATENT DOCUMENTS

| 6,076,083 | A | * | 6/2000 | Baker | H04L 69/40 706/52 |
| 6,598,033 | B2 | * | 7/2003 | Ross | H04L 41/0631 706/45 |
| 7,200,525 | B1 | | 4/2007 | Williams et al. | |
| 7,379,846 | B1 | | 5/2008 | Williams et al. | |
| 8,199,641 | B1 | * | 6/2012 | Jagannathan | H04L 43/026 370/229 |
| 8,451,731 | B1 | * | 5/2013 | Lee | H04L 43/026 370/235 |
| 8,539,474 | B2 | | 9/2013 | Declercq et al. | |

(Continued)

*Primary Examiner* — Moustafa M Meky
(74) *Attorney, Agent, or Firm* — Behmke Innovation Group LLC; James Behmke; Stephen D. LeBarron

(57) ABSTRACT

In one embodiment, a supervisory device in a network identifies a workaround for a symptom exhibited by a particular device in the network by traversing a path in a symptom-problem graph. The path in the graph includes a symptom vertex that represents the symptom, a problem vertex that shares an edge with the symptom vertex and represents a problem that causes the symptom, and a workaround vertex that shares an edge with the problem vertex and represents the workaround for the symptom. The supervisory device causes the identified workaround to be applied to the particular device and updates the path in the graph to replace the workaround vertex with a fix vertex that represents a fix for the problem that causes the symptom exhibited by the particular device. The supervisory device causes the fix to be applied to the particular device based on the updated path in the graph.

20 Claims, 12 Drawing Sheets

(56) References Cited

U.S. PATENT DOCUMENTS

| | | | |
|---|---|---|---|
| 9,026,856 B2 | 5/2015 | Hecox et al. | |
| 9,397,880 B1* | 7/2016 | Lee | H04L 43/026 |
| 9,680,843 B2* | 6/2017 | Murynets | H04L 63/1433 |
| 10,142,354 B2* | 11/2018 | Murynets | H04L 63/1408 |
| 2005/0210132 A1* | 9/2005 | Florissi | G06Q 10/00 |
| | | | 709/224 |
| 2005/0210133 A1* | 9/2005 | Florissi | G06F 11/3006 |
| | | | 709/224 |
| 2007/0294090 A1 | 12/2007 | Thieret et al. | |
| 2008/0215601 A1* | 9/2008 | Seki | G06F 11/328 |
| 2009/0313506 A1* | 12/2009 | Elizarov | G06F 11/3688 |
| | | | 714/37 |
| 2011/0022882 A1* | 1/2011 | Jaehde | G06F 11/2023 |
| | | | 714/4.1 |
| 2017/0289177 A1* | 10/2017 | Murynets | H04L 63/1433 |

* cited by examiner

TRACKING AND IMPLEMENTING WORKAROUNDS TO COMPUTER-RELATED ISSUES

TECHNICAL FIELD

The present disclosure relates generally to computer networks, and, more particularly, to tracking and implementing workarounds to computer-related issues.

BACKGROUND

Computer network can experience any number of operational problems stemming from bugs, misconfigurations, changing network conditions, and the like. Accordingly, there has been recent interest in developing network monitoring systems that are able to automatically detect problems and alert a network administrator when the system detects a problem. In turn, the administrator may attempt to resolve the problem for the affected device(s). In other words, modern network monitoring systems still typically require manual intervention by a network administrator to address problems detected in the network.

Complicating the automatic deployment of fixes to detected network problems is the fact that an actual fix to a network problem is often not available at the time the problem is detected. For example, a detected problem may be due to an underlying software bug that can only be fixed via a software patch from the manufacturer that addresses the bug. Until the patch is released, however, there may be one or more workarounds available at the time of detection. Typically, these workarounds do not solve the underlying problem but, instead, address the symptoms of the problem. For example, in the case of a bug present in a software module, one workaround may be to simply disable the software module until a hot fix becomes available. However, by doing so, this may cause another problem to exhibit itself in the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
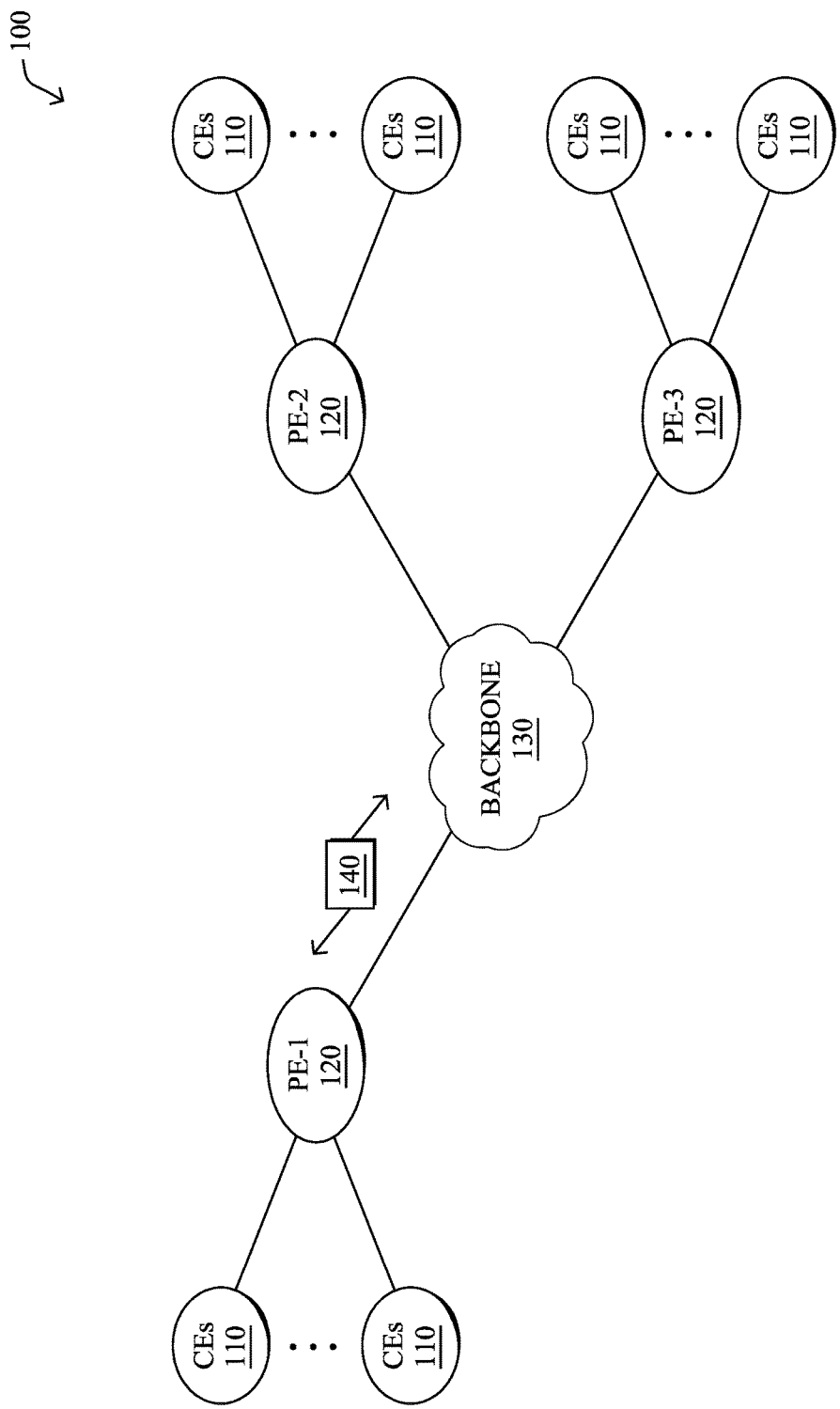
FIGS. 1A-1B illustrate an example communication network.

According to one or more embodiments of the disclosure, a supervisory device in a network identifies a workaround for a symptom exhibited by a particular device in the network by traversing a path in a symptom-problem graph. The path in the graph includes a symptom vertex that represents the symptom, a problem vertex that shares an edge with the symptom vertex and represents a problem that causes the symptom, and a workaround vertex that shares an edge with the problem vertex and represents the workaround for the symptom. The supervisory device causes the identified workaround to be applied to the particular device and updates the path in the graph to replace the workaround vertex with a fix vertex that represents a fix for the problem that causes the symptom exhibited by the particular device. The supervisory device causes the fix to be applied to the particular device based on the updated path in the graph.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
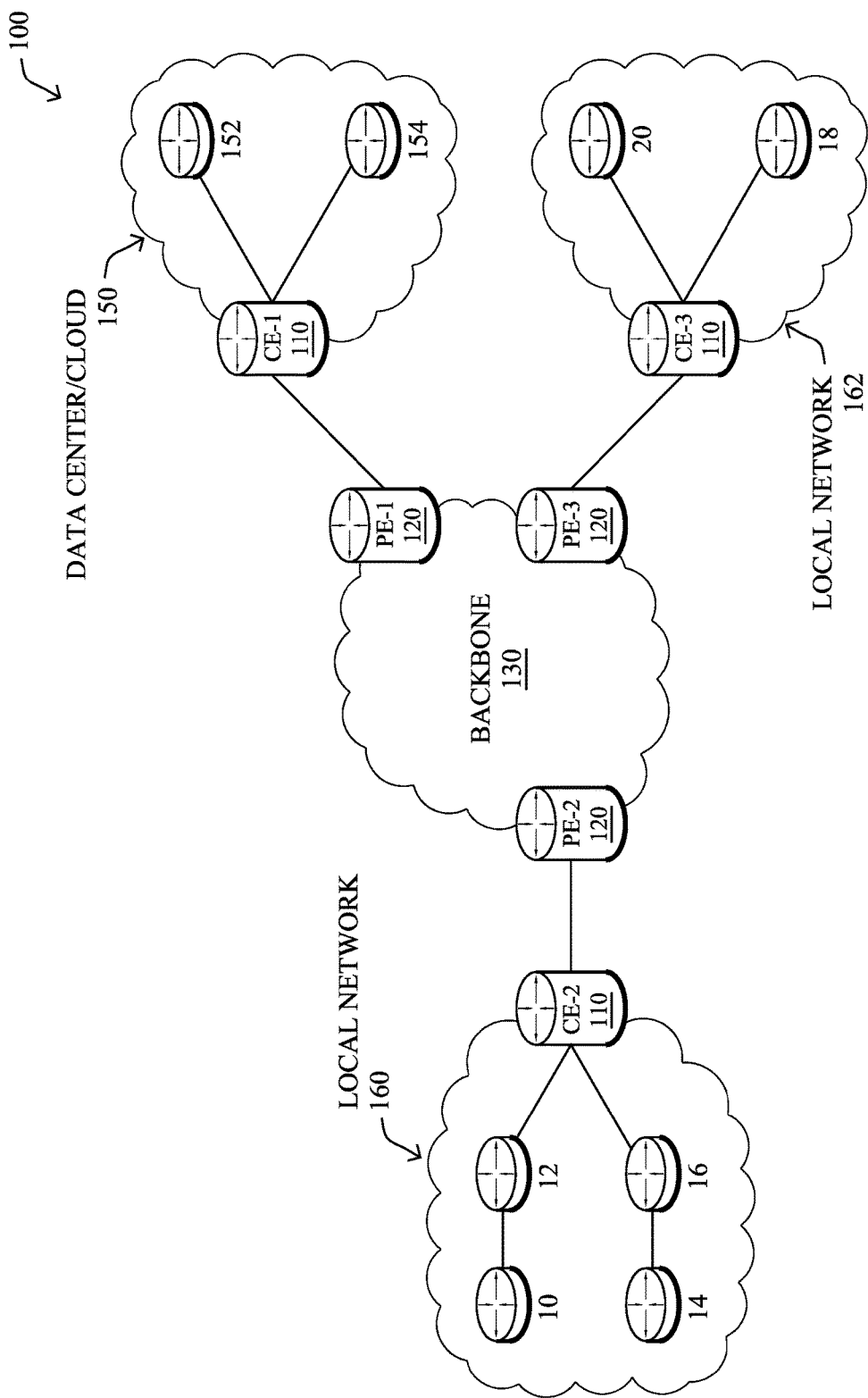

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
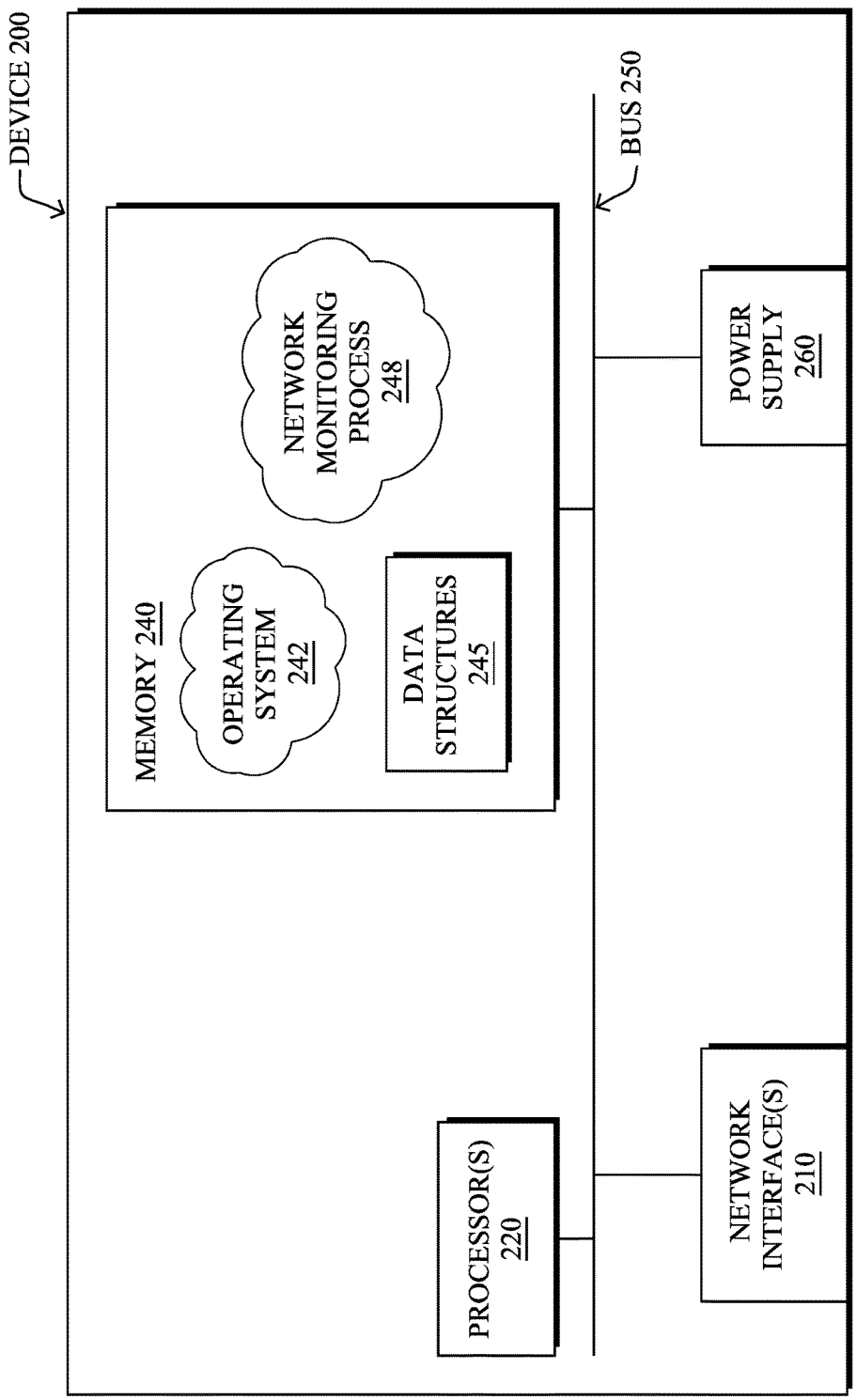
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise, illustratively, a network monitoring process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, a network monitoring system may encounter any number of different problems due to bugs, malfunctions, misconfigurations, etc. Such problems may be identified based on user feedback (e.g., a user reports a symptom of a problem) and/or based on monitored data from the network. For example, the monitoring system may receive traffic records (e.g., NetFlow records, IPFIX records, etc.), Simple Network Management Protocol (SNMP) data, and the like, regarding the operation of the network. From this, the monitoring system can diagnose a problem based on the symptoms that present themselves in the network.

To automatically address problems detected in a network, the monitoring system must first be able to track which problems have been addressed for a particular device or set of devices in the network. In other words, the monitoring system must be able to track which workarounds have been applied to a given device affected by a problem. Then, when a true fix is available, the monitoring system can automatically apply the fix to the device and roll back the interim workaround, to restore the device to its working, natural state. However, this is not a straightforward approach for the following reasons:

Often, problems will have more than one workaround leading to the question, "which workaround should be applied automatically?"

Implementing a selected workaround or fix could result in a regression, whereby the applied workaround or fix causes another problem to occur.

Tracking and Implementing Workarounds to Computer-Related Issues

The techniques herein provide a way for a network monitoring system to automatically apply workarounds and fixes to problems detected on a device in the monitored network. In some aspects, the monitoring system may identify all possible workarounds and fixes for a problem and, in turn, identify the best path to resolve the problem at any given point in time. In further aspects, the monitoring system may track all applied workarounds and remove them once an available fix is applied to the affected device, thereby cleaning up any automatically applied workarounds.

Specifically, according to one or more embodiments of the disclosure as described in detail below, a supervisory device in a network identifies a workaround for a symptom exhibited by a particular device in the network by traversing a path in a symptom-problem graph. The path in the graph includes a symptom vertex that represents the symptom, a problem vertex that shares an edge with the symptom vertex and represents a problem that causes the symptom, and a workaround vertex that shares an edge with the problem vertex and represents the workaround for the problem. The supervisory device causes the identified workaround to be applied to the particular device and updates the path in the graph to replace the workaround vertex with a fix vertex that represents a fix for the problem that causes the symptom exhibited by the particular device. The supervisory device causes the fix to be applied to the particular device based on the updated path in the graph.

Illustratively, the techniques described herein may be performed by hardware, software, and/or firmware, such as in accordance with the network monitoring process 248, which may include computer executable instructions executed by the processor 220 (or independent processor of interfaces 210) to perform functions relating to the techniques described herein.

Operationally, the techniques herein allow for a network monitoring system to keep track of the symptoms exhibited by a device in the monitored network, the root causes (i.e., problems) of the symptoms, the workarounds available and/or applied to the device, as well as the fixes available and/or applied to the device. In addition, for each workaround and/or fix, the monitoring system tracks any additional problems that the workarounds and fixes may cause. This enables the system to automatically determine the best course of action to be taken when addressing the symptoms exhibited by a particular device in the network. In other words, the techniques herein provide a methodical way that a network monitoring system can use to autonomously determine the best resolution path for a problem at any given time, keeping track of all applicable workarounds, and reverting those changes when ultimate fixes are available and applied.

Figure 3A:
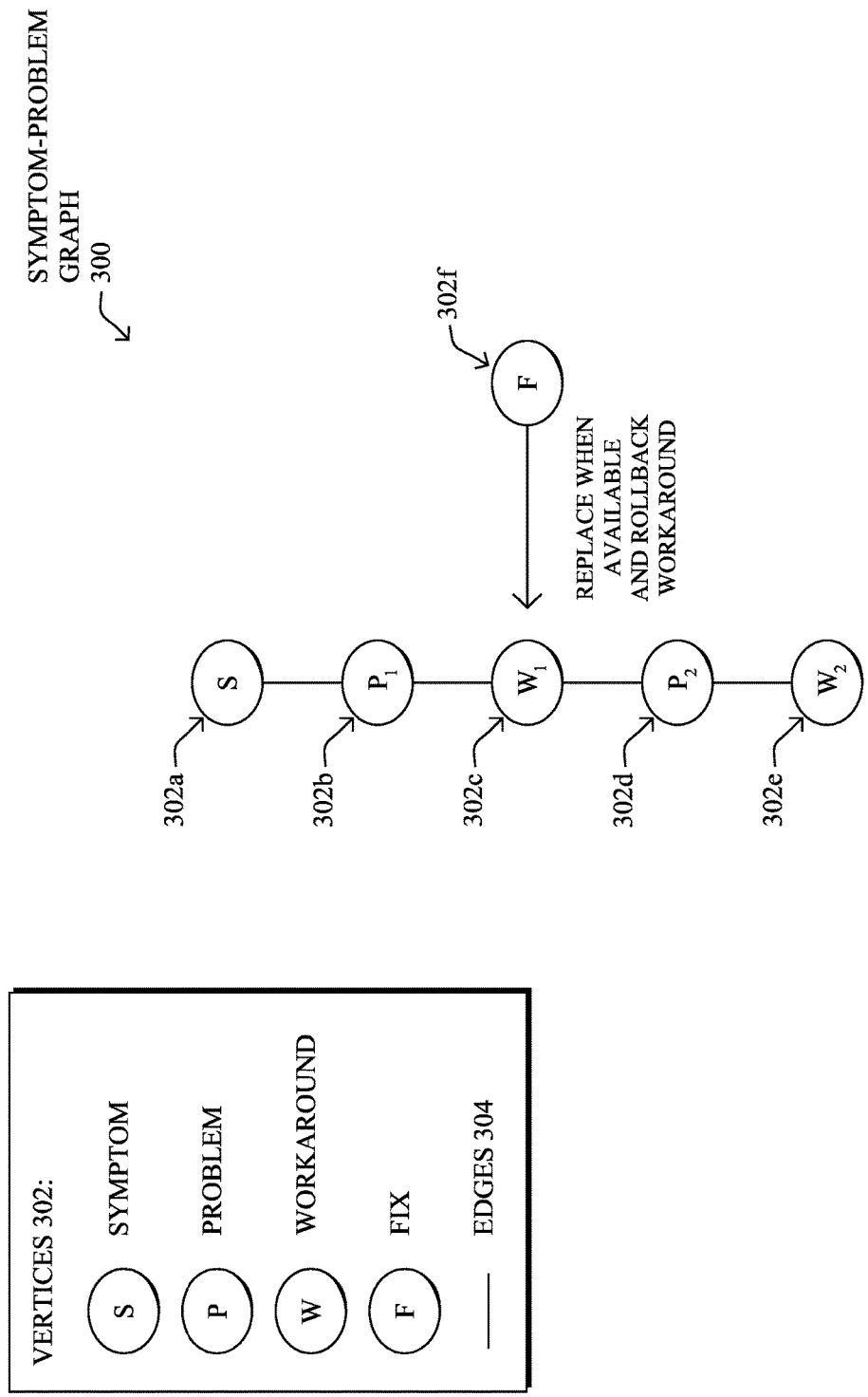
FIGS. 3A-3C illustrate example symptom-problem graphs.
Figure 3B:
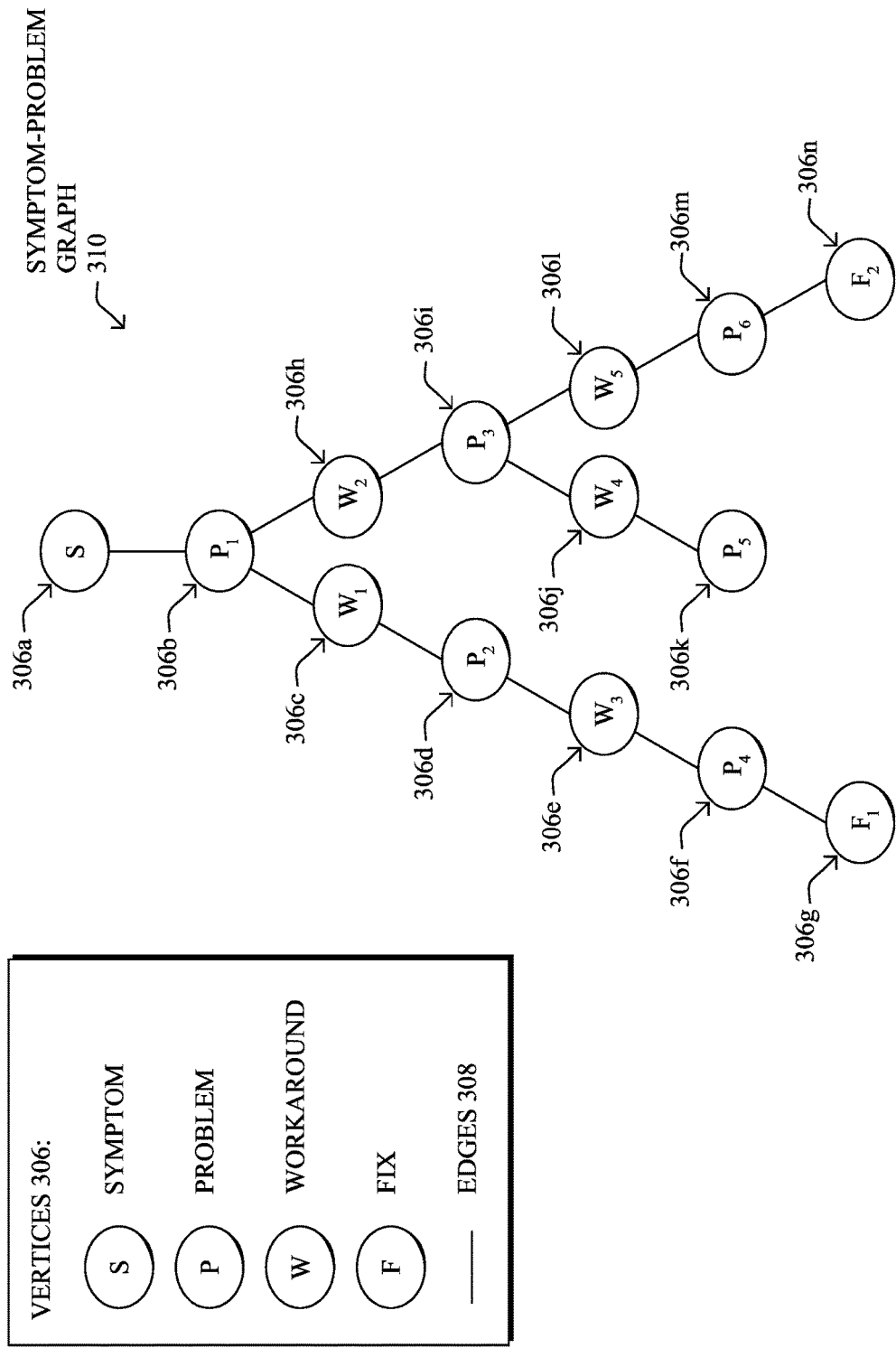
Figure 3C:
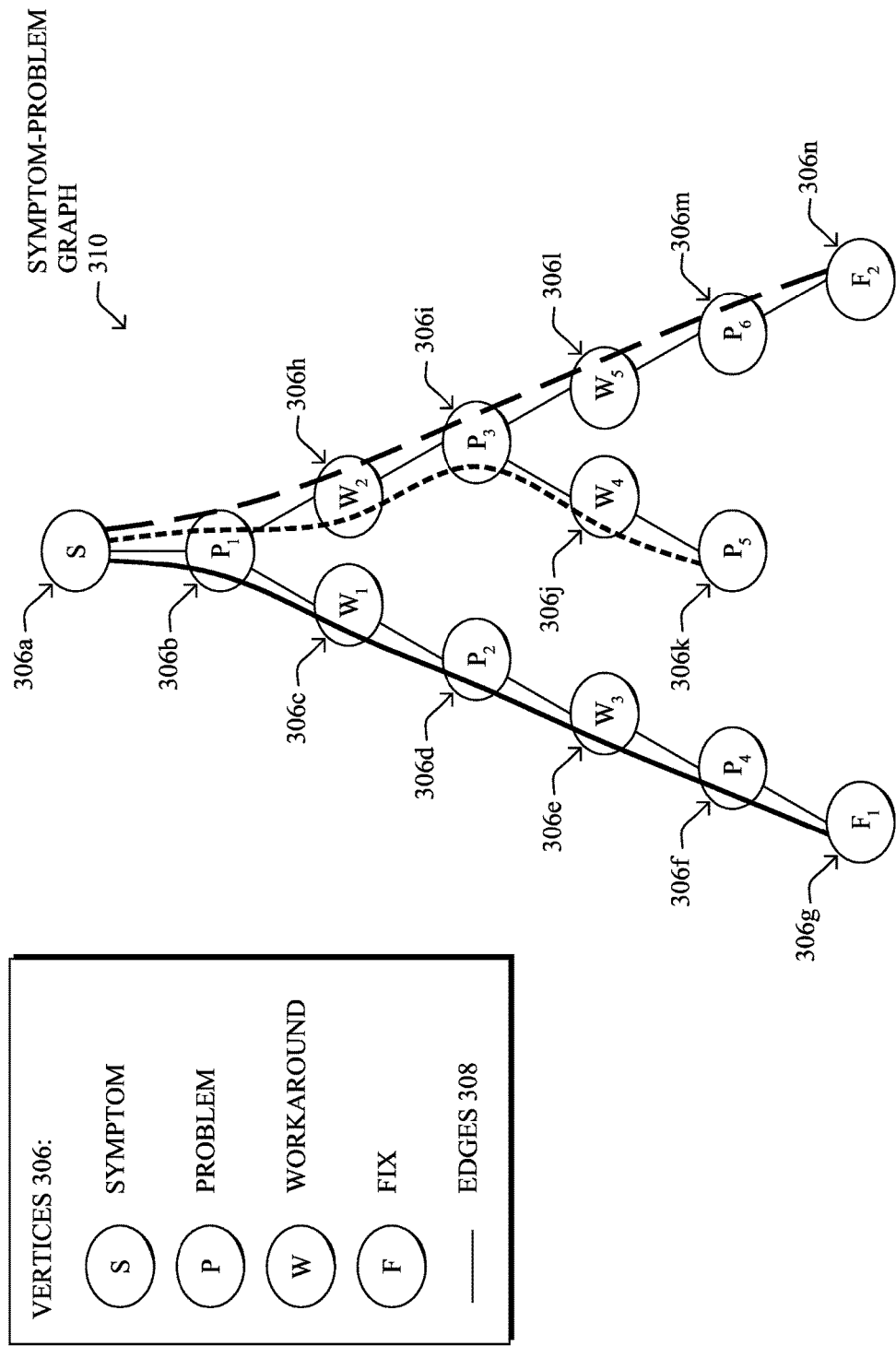

According to various embodiments, the network monitoring system may maintain a symptom-problem graph that relates symptoms, problems, workarounds, and fixes available at any given time to the network. FIGS. 3A-3C illustrate examples of such graphs.

FIG. 3A illustrates a simple symptom-problem graph 300 that may be used by the network monitoring system to track the relationships between symptoms, problems, workarounds, and fixes for the monitored network. Notably, as shown, each vertex 302 in graph 300 may represent a symptom (denoted "S"), a problem (denoted "P"), a workaround (denoted "W"), or a fix (denoted "F"). As used herein, a symptom refers to any observable characteristic of a device or set of devices in the network that is indicative of an underlying problem. For example, a device running out of available memory on a periodic basis may be indicative of a memory leak in the device's programming, i.e., the underlying problem. In general, a workaround refers to any action that may alleviate a symptom or set of symptoms, but does not fully solve the underlying problem that resulted in the observed symptom(s). In contrast, a fix refers to any action that specifically targets the underlying cause/problem that gave way to the observed symptom(s).

Edges 304 between the vertices 302 represent the corresponding relationships and associations between the different vertices 302. For example, an edge between a symptom vertex 302 and a problem vertex 302 indicates that the represented symptom is caused by the represented problem. Similarly, an edge between a problem vertex 302 and a workaround vertex 302 may indicate that the represented workaround at least addresses the symptom associated with the represented problem. Likewise, an edge between a problem vertex 302 and a fix vertex 302 may indicate that the represented fix addresses the underlying problem represented by the problem vertex 302. In some embodiments, a symptom-problem graph such as graph 300 may be a directed graph in which edges 304 are unidirectional and the vertices 302 have parent-child relationships. For example, if a workaround or fix vertex 302 is a parent of a problem vertex 302, this may indicate that implementing the represented workaround would result in the represented problem. In some embodiments, a symptom-problem graph may simply be a tree with the symptom vertex as the root of the tree (e.g., as shown). In other embodiments, a symptom-problem graph may include loops.

By way of example of the difference between symptoms, problems, workarounds, and fixes, consider the potential symptom of not being able to connect to a particular device in the monitored network via Telnet. An underlying problem that causes this symptom may be a condition whereby Telnet needs to be toggled off and then back on again on the device before Telnet begins working. In such a case, one potential workaround would be to simply toggle Telnet off and on, to enable Telnet on the device. Another potential workaround, of course, could also be to have the device use a different protocol than Telnet. However, neither of these workarounds addresses the root problem of the device not supporting Telnet from the start. A potential fix, in contrast, might be a software patch, new image version, etc. that can be deployed to the device that would cause the device to enable Telnet correctly.

As shown, symptom-problem graph 300 comprises vertices 302a-302e that functionally organize the relationships between the symptoms, problems, and workaround, and potential fixes that are available to the network monitoring system. For example, vertex 302a may represent a symptom that the monitoring system may detect from captured network records or via user reporting. In turn, a network problem-analysis system may link this symptom to an underlying problem $P_1$, which the monitoring system may represent in graph 300 as problem vertex 302b. Similarly, the system may link the problem represented by vertex 302b to any number of workarounds, such as a first workaround $W_1$ represented by vertex 302c.

However, it may be the case that implementing workaround $W_1$ of vertex 302c would also cause a second problem $P_2$ to occur, as represented by vertex 302d. To address problem $P_2$, another workaround, $W_2$, may need to be applied to the affected device. In various embodiments, the system that provides the information needed to populate symptom-problem graph 300 may be a human administrator, one or more computerized services (e.g., a cloud-based service), or a combination thereof.

When a fix to problem $P_1$ becomes available, the monitoring system may make the necessary adjustments to symptom-problem graph 300. For example, as shown in FIG. 3A, fix vertex 302f may replace workaround vertex 302c as a child vertex of problem vertex 302b. Assume also that implementing the fix for problem $P_1$ would not result in secondary problem $P_2$ occurring, as would be the case when workaround $W_1$ is implemented. In such a case, vertices 302d and 302e would also no long need to be included in graph 300, making fix vertex 302f the sole child of vertex 302b.

As a more concrete example of the operation of symptom-problem graph 300, assume that a certain model of firewall crashes and needs to be reloaded due to a documented software bug XXX12345. In such a case, the network monitoring system can detect this condition automatically, as well as its underlying cause/problem, through analysis of the resulting crash report from the firewall. As a workaround, H323 inspection can be disabled on the device. However, doing so may result in a second problem occurring whereby there is only one way audio now between endpoints, thus requiring a second workaround of opening ACLs between the calling endpoints. To represent this information, the monitoring system may construct the vertices 302 shown in FIG. 3A as follows:

Vertex 302a:
{
   "description": "Firewall reloads during active calls"
}
Vertex 302b:
{
   "description": "XXX12345 - device crash due to H323 inspection",
   "checks": "XXX12345_reload_1"
}
Vertex 302c:
{
   "description": "Disable H323 inspection",
   "API_commands": "no inspect h323 ras"
}
Vertex 302d:
{
   "description": "One way audio between calling endpoints", -continued

```
"checks": "audio_conn_check_ 1"
}
Vertex 302e:
{
    "description": "Open ACLs between calling endpoints",
    "API_commands": "access-list outside_access_in permit udp
    subnet_1 subnet_2"
}
```

Then, when a fix becomes available, the monitoring system may represent vertex 302f as follows:

```
Vertex 302f:
{
    "description": "Upgrade version",
    "API_commands":
        ["copy image flash:",
        "write mem",
        "reload"]
    "available": "NOT_AVAILABLE"
}
```

According to various embodiments, the ordering of a path within a symptom-problem graph may also indicate to the monitoring system the order in which workaround and/or fixes should be applied to a particular device in the network. Notably, in the above example, applying the workaround represented by vertex 302e before applying the workaround represented by vertex 302c would prevent the secondary problem represented by vertex 302d from occurring. In particular, opening the ACLs before removing the H323 inspection by the device will address the device crashing symptom while still avoiding the secondary problem of one way audio between the endpoints. When a fix later comes along, such as a software version upgrade, as represented by vertex 302f, this vertex can then be substituted into graph 300 as a direct fix for bug XXX12345 that causes the crashing problem.

As shown in FIG. 3B, more complicated symptom-problem graphs are also possible, especially when multiple fixes or workarounds are available. For example, symptom-problem graph 310 may include vertices 306 that are connected by edges 308 and represent the various symptoms ("S"), problems ("P"), workarounds ("W"), and fixes ("F") available at a given time. Here, in contrast to graph 300 in FIG. 3A, assume that there are two workarounds $W_1$ and $W_2$, represented by vertices 306c and 306d, that could be implemented with respect to the initial problem $P_1$, represented by vertex 306b, that causes symptom S, represented by vertex 306a. If workaround $W_1$ is selected, this may lead to a chain of additional problems, workarounds, and fixes, as represented by vertices 306d-306g. Likewise, if workaround $W_2$ is implemented, this may result in another problem $P_3$ occurring, which itself may have multiple workarounds, as represented by vertices 306i-306n.

As shown in FIG. 3C, there are three potential resolution paths 312a-312c that are possible from the topology of problem-solution graph 300, to address the symptom S. According to various embodiments, the monitoring system may select among paths 312a-312c to pick the optimal resolution for the symptom represented by vertex 306a. In some embodiments, the optimal resolution path may be the shortest path among paths 312a-312c. In other words, the path having the least number of problems, workarounds, and/or fixes may be the optimal choice to resolve the symptom.

In further embodiments, weightings may also be applied to vertices 306 and/or edges 308, thus making the path having the lowest (or potentially highest) overall weight the optimal resolution path. For example, the severity of a problem introduced by a workaround could be translated into a weight associated with its problem vertex. In another example, a weighting may be based on how one path may affect critical portions of the network versus another portion of the network. Further example weights may be associated with a graph path based on the amount of time, resources, network impact, etc., which may result from applying the workarounds and/or fixes in the path to a device in the network.

A further factor that the network monitoring system may assess when selecting the optimal resolution path from a symptom-problem graph is whether a given path is incomplete. As used herein, an incomplete path refers to a path that terminates with a problem vertex. In other words, an incomplete path is one that may include workaround and/or fixes that, if applied to a device in the network, would result in a further problem occurring that would remain unaddressed. For example, as shown, even though path 312b in graph 300 is technically the shortest path, it is also an incomplete path and may be excluded from further consideration as a potential resolution to symptom S. In other embodiments, an incomplete path may still be eligible for selection as the resolution path. For example, when the severity of the terminal problem vertex in the path is considerably less than that of the initial problem associated with the exhibited symptom (e.g., $P_5$ is significantly less severe than $P_1$), the monitoring system may still consider the path as eligible for selection to resolve the symptom.

Note that in some cases, a given symptom in a symptom-problem graph may also be associated with a number of underlying problems. For example, a high CPU usage by a particular device may have dozens of underlying problems that are causing the device to exhibit this symptom. In such cases, the monitoring system may use a symptom-problem tree that has multiple edges with the symptom or, alternatively, multiple symptom-problem trees for each underlying problem. In either case, the monitoring system may resolve these problems by traversing their corresponding paths in the graph(s) and identifying the proper workarounds and/or fixes.

If the monitoring system detects a symptom for which there is no known underlying problem, the system may generate a new problem vertex to account for this symptom. The details of the problem vertex may be populated over time using, e.g., machine learning, data from a problem-analysis system, an expert, or the like.

Figure 4:
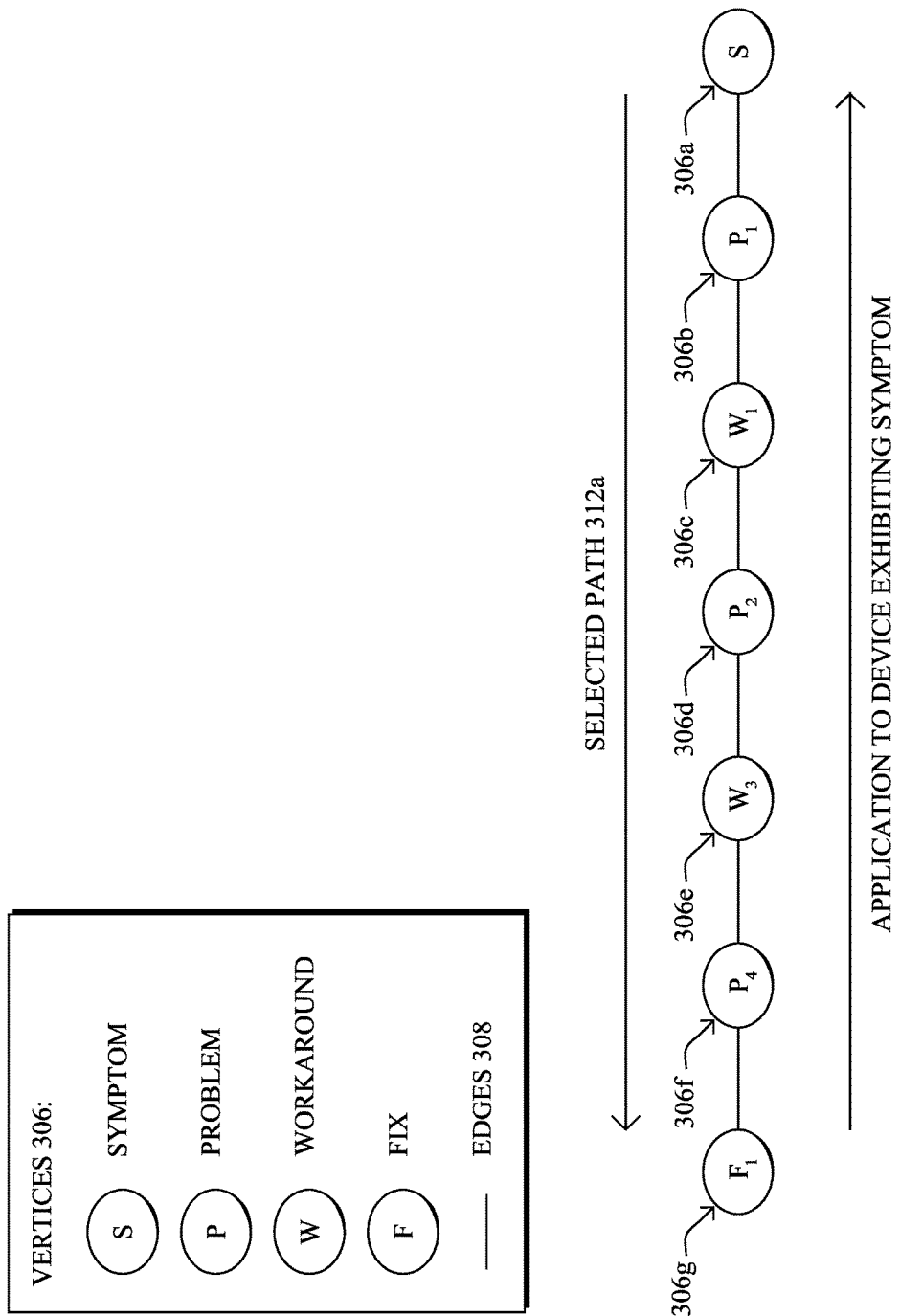
FIG. 4 illustrates an example selected path from a symptom-problem graph.

As shown in FIG. 4, assume that the monitoring system selects path 312a from graph 310 shown in FIG. 3C as the optimal resolution path for the symptom represented by vertex 306a. For example, path 312a may be selected based on path 312a being the shortest, complete path in symptom-problem graph 310. In such a case, the selected path 312 may indicate the ordering via which the fixes and/or workarounds should be applied to the device exhibiting the symptom represented by vertex 306a.

In various embodiments, the application of the workarounds and/or fixes may be applied in reverse order of the path, in a direction towards the symptom vertex. For example, as shown, the fix $F_1$ represented by vertex 306g may be applied first to the affected device in the network, then the workaround $W_3$ represented by vertex 306e applied, then the workaround $W_1$ represented by vertex 306c applied to the particular device in the network. In doing so, further problems that may be caused by the application of a workaround or fix may be avoided beforehand, thereby ensuring that any secondary, tertiary, etc., problems do not occur.

Referring now to FIGS. 5A-5D, an example device graph 500 is shown, according to various embodiments. As noted above, a symptom-problem graph maintained by the network monitoring system may change over time, such as when a fix becomes available for a given problem, thereby supplanting a workaround. To track the workarounds and/or fixes that have been applied to a given device or set of devices, or could be applied to the device(s), the monitoring system may also maintain a device graph that can also change over time.

Figure 5A:
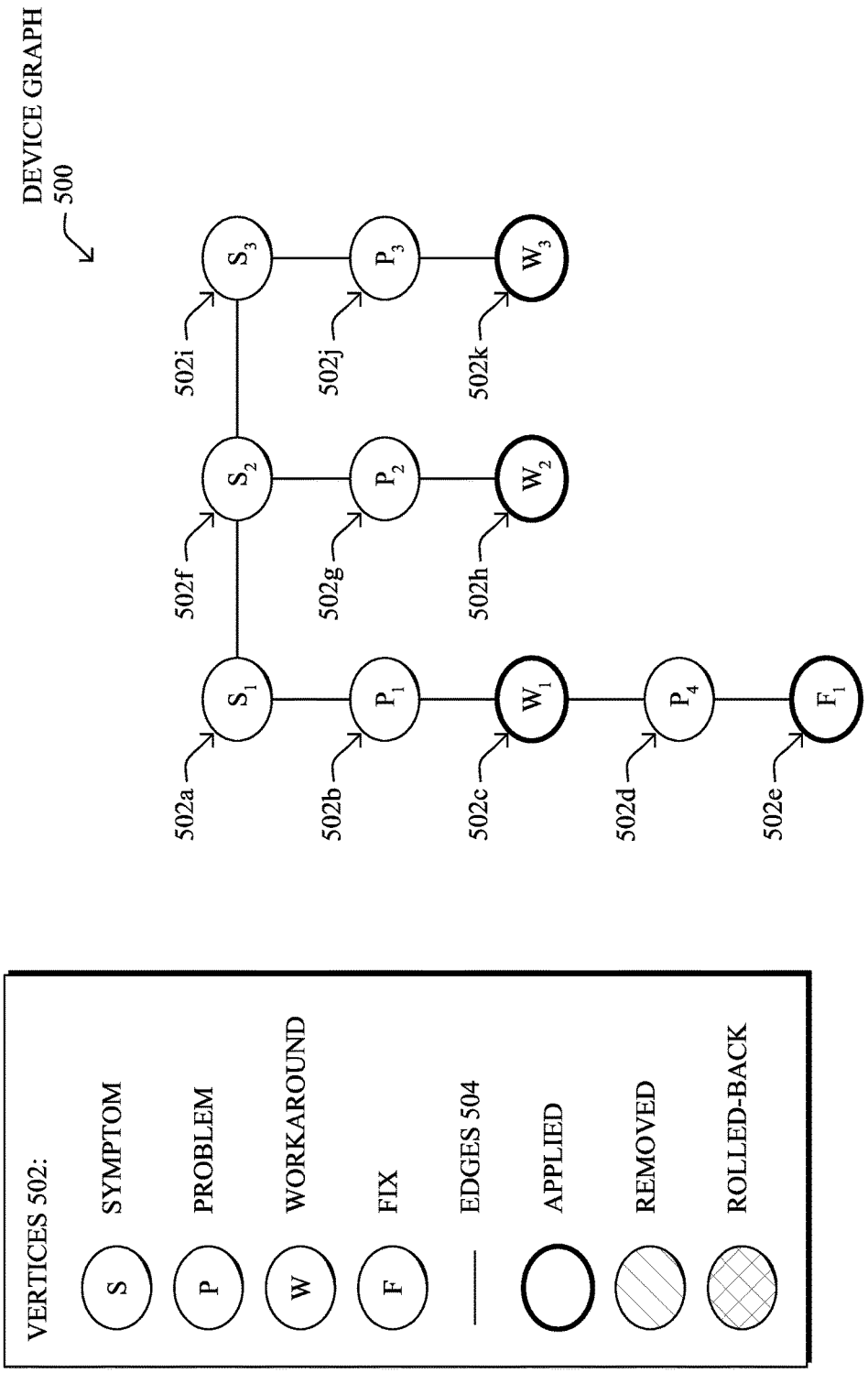
FIGS. 5A-5D illustrate an example device graph.

As shown in FIG. 5A, device graph 500 may include vertices 502 and edges 504 that represent the symptoms exhibited by the device(s) in the monitored network, the underlying problems, and the associated workarounds and/or fixes, in a similar manner to that of a symptom-problem graph maintained by the monitoring system. More specifically, device graph 500 may include the resolution paths selected by the monitoring system from the symptom-problem graph(s) for the particular device(s) associated with device graph 500. In the case of graph 500 representing a group of devices, the devices may share some common features, such as devices of the same make or model, devices deployed in a certain portion of the monitored network, or the like.

Vertices 502 in device graph 500 may also have associated states, to track which workaround and/or fixes have been applied to the particular device(s). Notably, a workaround vertex 502 may be in one of three states at any given time: applied, rolled-back, or removed. For example, if a fix later becomes available for a given problem, an applied workaround for that problem may be rolled-back by the monitoring system after application of the fix to the device(s). Similarly, a fix vertex 502 may be in one of two states at any given time: applied or removed.

Also as shown in FIG. 5A, assume that the device(s) associated with device graph 500 were experiencing some or all of symptoms $S_1$-$S_3$, as represented by vertices 502$a$, 502$f$, 502$i$. In such a case, the monitoring system may assess the corresponding symptom-problem graphs for these symptoms and, in turn, select the resolution paths shown, as represented by vertices 502$b$-502$e$, 502$g$-502$h$, and 502$j$-502$jk$. In turn, the monitoring system may cause the workarounds represented by vertices 502$c$, 502$h$, and 502$k$, as well as the fix represented by vertex 502$e$, to be applied to the affected device(s) and in accordance with the ordering of the resolution paths. Graph 500 can also be used, for example, to provide data to a user interface, thereby allowing a network administrator to assess the status of the device(s) in terms of their observed symptoms, problems, workarounds, and/or fixes.

Figure 5B:
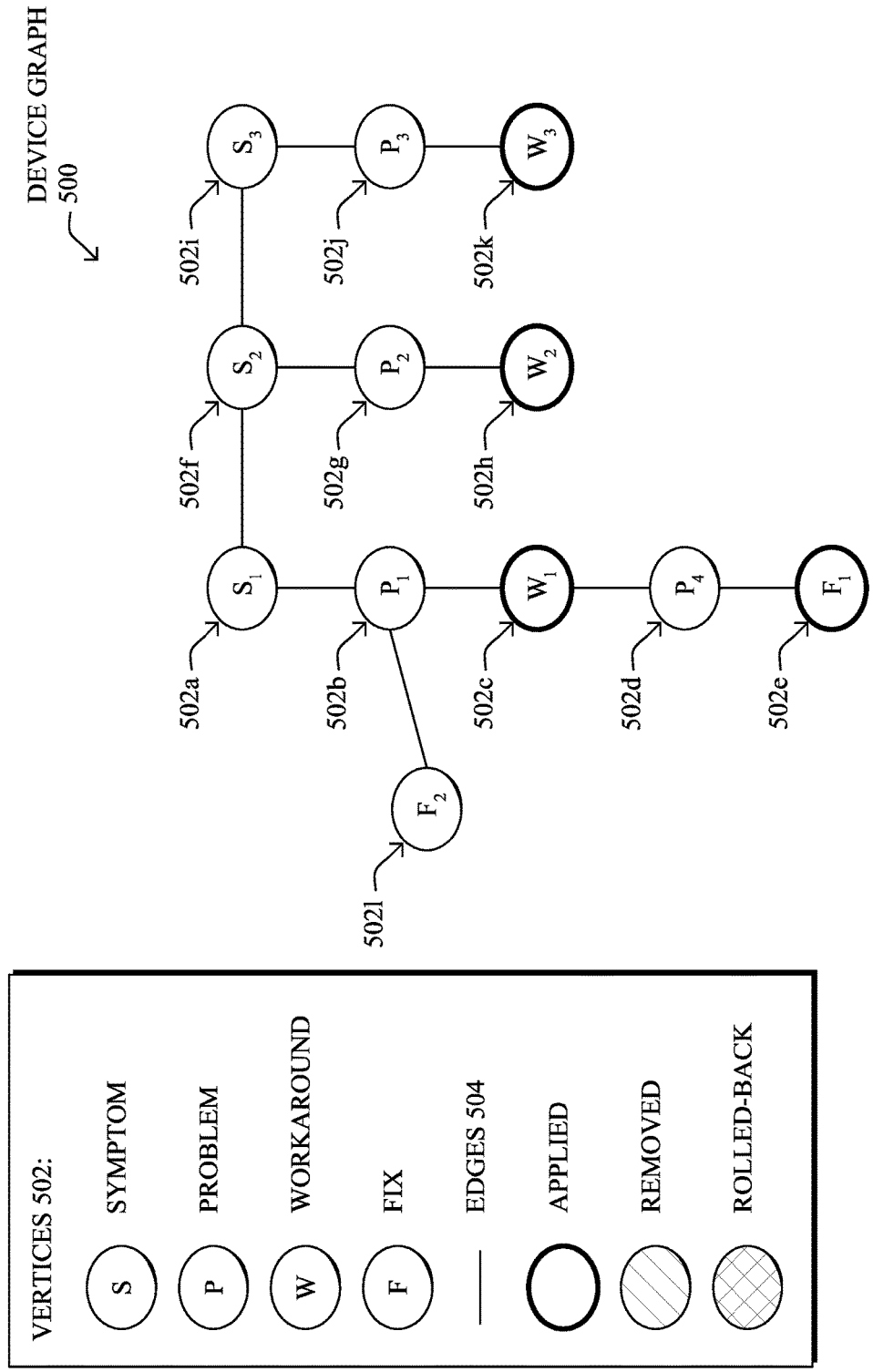
Figure 5C:
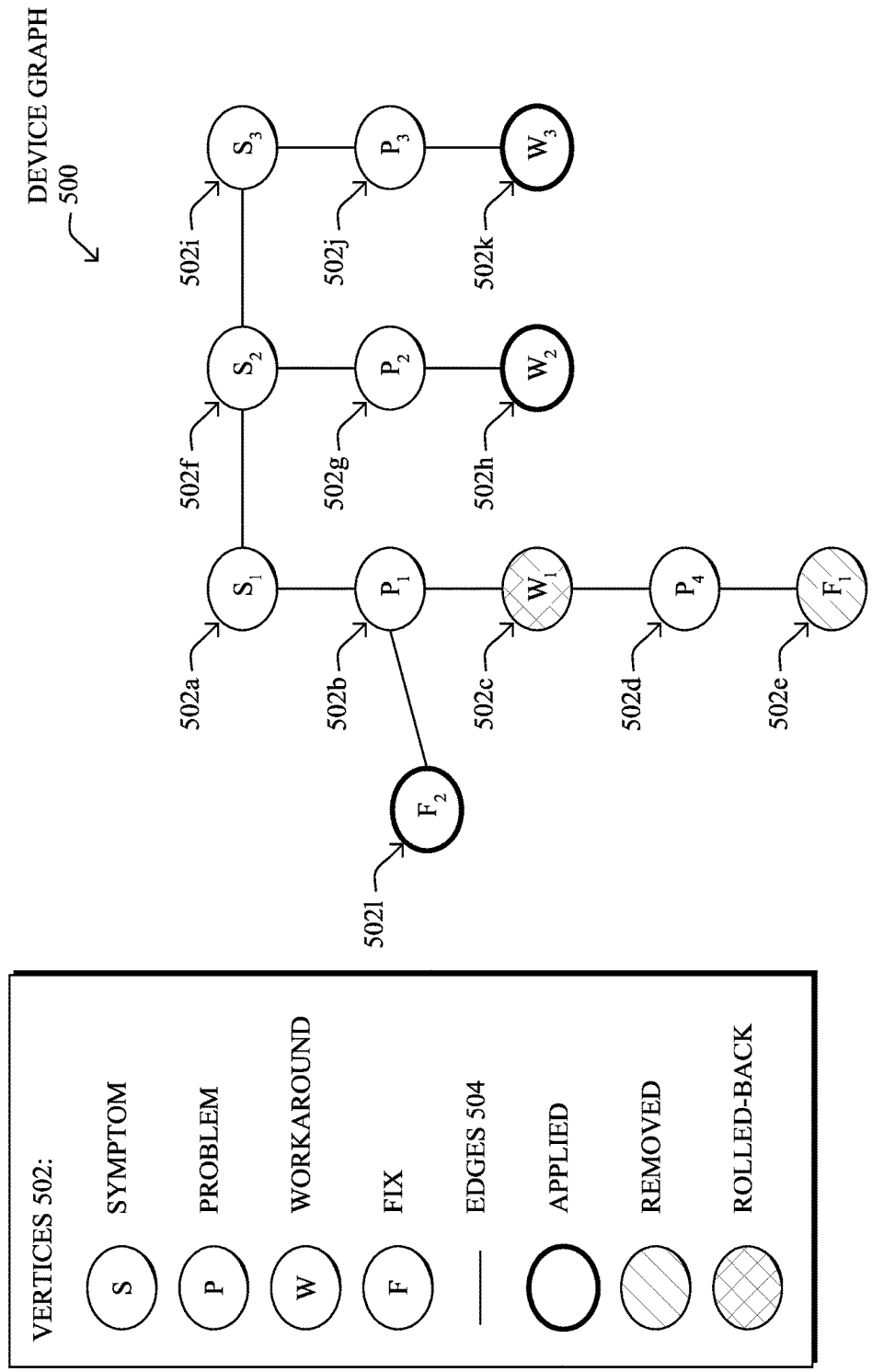
Figure 5D:
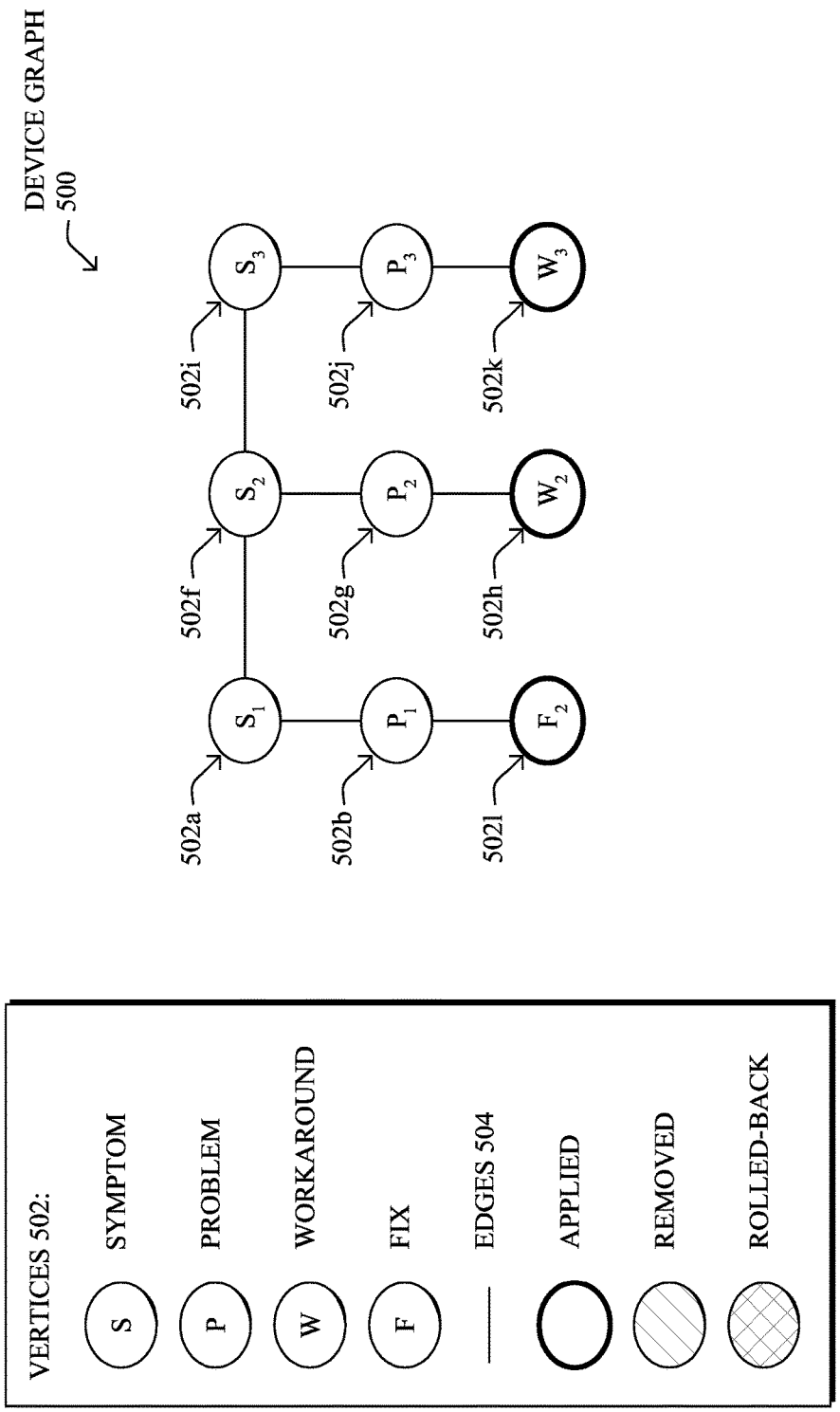

When a change is made to a symptom-problem graph that affects a device, the monitoring system may also make corresponding changes to the device graph for that device. For example, as shown in FIG. 5B, assume that a new fix, $F_2$, as represented by vertex 5021, becomes available to address problem $P_1$ represented by vertex 502$b$. In turn, the monitoring system may cause fix $F_2$ to be applied to the device(s), as illustrated in FIG. 5C. In addition, after application of fix $F_2$, the monitoring system may cause workaround $W_1$ to be rolled-back from the device and/or fix $F_1$ to be removed entirely from the device. Note also that the monitoring system may also be intelligent enough to understand that a single application of a fix, such as a software update, may fix multiple problems, thereby causing the system to remove multiple workarounds. After doing so, the monitoring system may also update graph 500 to represent the most current state of the device(s), as shown in FIG. 5D.

In further embodiments, the monitoring system may track problems and mitigations (e.g., workarounds and fixes) across multiple devices, as well. For example, by attempting to resolve or mitigate a problem on one device, this may cause another device to experience another problem. In these cases, the monitoring system may either attach multiple devices to the same graph and/or encode dependences between different vertices (e.g., the fix for problem A on device 1 requires resolution of problem B on device 2, etc.).

Figure 6:
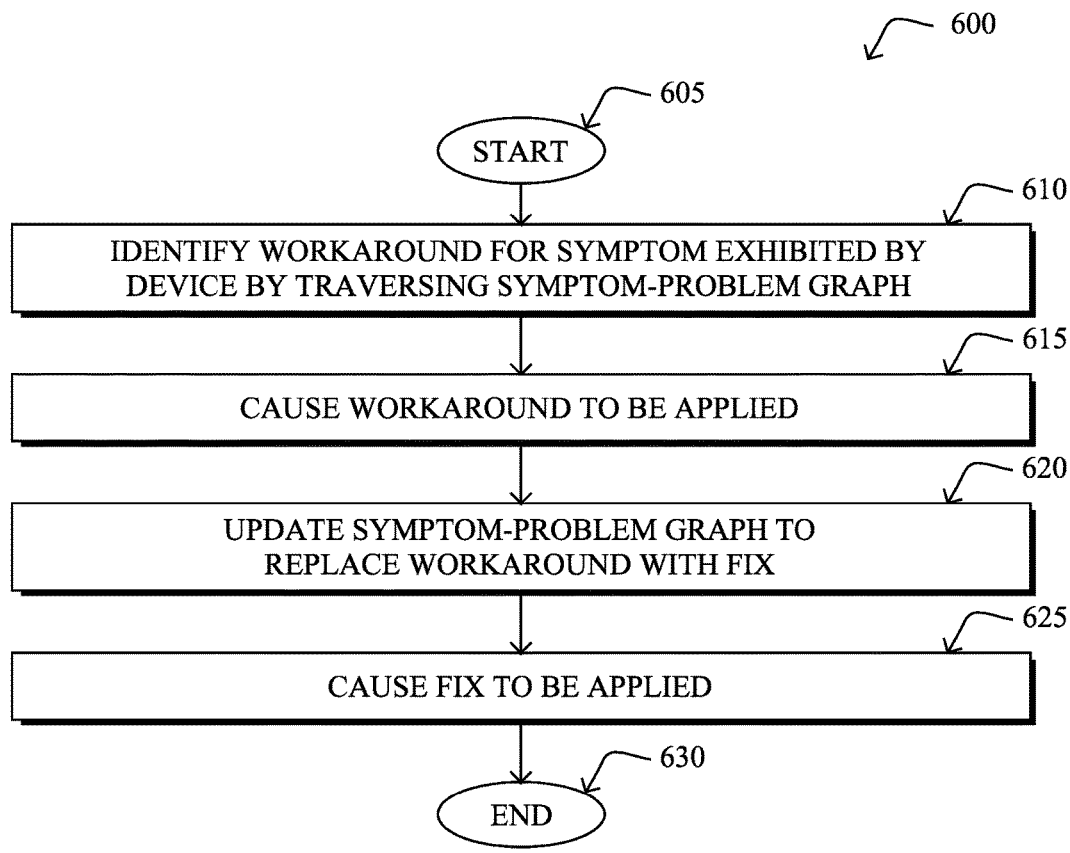
FIG. 6 illustrates an example simplified procedure for tracking workarounds to problems in a network and implementing true fixes when available.

FIG. 6 illustrates an example simplified procedure for tracking workarounds to problems in a network and implementing true fixes when available, in accordance with one or more embodiments described herein. For example, a non-generic, specifically configured device (e.g., device 200) may perform procedure 600 by executing stored instructions (e.g., process 248). Notably, a supervisory device, such as a device that is part of a network monitoring system, may perform procedure 600. The procedure 600 may start at step 605, and continues to step 610, where, as described in greater detail above, the supervisory device may identify a workaround for a symptom exhibited by a particular device in the network by traversing a path in a symptom-problem graph. The particular device in the monitored network may be, for example, a router, switch, firewall, end user device, or the like. The traversed path may comprise a symptom vertex that represents the symptom, a problem vertex that shares an edge with the symptom vertex and represents a problem that causes the symptom, and a workaround vertex that shares an edge with the problem vertex and represents the workaround for the symptom.

At step 615, as detailed above, the supervisory device may cause the identified workaround to be applied to the particular device in the monitored network. Preferably, the supervisory device causes the identified workaround to be applied to the particular device automatically. For example, the supervisory device may send an instruction and/or download to the particular device either directly, or via an intermediary. However, in further embodiments, the supervisory device may also cause the workaround to be applied by generating a notification for a network administrator, thereby allowing the administrator to manually apply the workaround.

At step 620, the supervisory device may update the path in the symptom-problem graph to replace the workaround vertex with a fix vertex, as described in greater detail above. The fix vertex may represent a fix for the problem that causes the symptom exhibited by the particular device. For example, if a software patch or update becomes available that addresses a particular problem, that fix may supplant the current workaround for the problem, as represented in the symptom-problem graph.

At step 625, as detailed above, the supervisory device may cause the fix from step 615 to be applied to the particular device based on the updated solution-problem graph, either automatically or manually. In addition, the supervisory device may roll-back and/or remove any workaround or fixes that have been applied to the device to address that problem in the meantime. For example, the supervisory device may cause the workaround identified in step 610 to be rolled back on the particular device, after application and validation of the fix. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the tracking and application of workaround and fixes to devices in a monitored network. This allows for the construction of a fully automated network monitoring system that can dynamically and automatically address symptoms and problems as they arise. In some aspects, the techniques allow for a relationship structure to be defined that links symptoms, problems, workarounds, and true fixes. Any workaround or fix which triggers another problem is also linked to that workaround/fix, building out a graph, potentially with multiple resolution paths. The monitoring system applies workarounds, when no fix is available, intelligently based on predefined path criteria (e.g., the shortest path, based on a weighting, etc.) and according to a path ordering that will have the least impact on the network. In addition, the system tracks the workarounds applied to a particular device in the monitored network and may remove them after applying and applying and verifying the true fix.

While there have been shown and described illustrative embodiments that provide for tracking and implementing workarounds to computer-related issues, it is to be understood that various other adaptations and modifications may be made within the spirit and scope of the embodiments herein. For example, while certain embodiments are described herein with respect to using certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   identifying, by a supervisory device in a network, a workaround for a symptom exhibited by a particular device in the network by traversing a path in a symptom-problem graph, wherein the path in the graph comprises a symptom vertex that represents the symptom, a problem vertex that shares an edge with the symptom vertex and represents a problem that causes the symptom, and a workaround vertex that shares an edge with the problem vertex and represents the workaround for the symptom;
   causing, by the supervisory device, the identified workaround to be applied to the particular device;
   updating, by the supervisory device, the path in the symptom-problem graph to replace the workaround vertex with a fix vertex that represents a fix for the problem that causes the symptom exhibited by the particular device; and
   causing, by the supervisory device, the fix for the problem to be applied to the particular device based on the updated path in the symptom-problem graph.

2. The method as in claim 1, wherein the fix for the problem comprises a software update for the particular device.

3. The method as in claim 1, further comprising:
   tracking, by the supervisory device, application of the identified workaround to the particular device; and
   causing, by the supervisory device, the workaround applied to the particular device to be rolled back based on the tracking of the application of the identified workaround to the particular device.

4. The method as in claim 3, wherein tracking the application of the identified workaround to the particular device comprises:
   maintaining, by the supervisory device, a device tree that is based on the symptom-problem tree.

5. The method as in claim 1, wherein the path in the symptom-problem graph comprises a plurality of workaround and problem vertices, and wherein an edge between a particular workaround vertex and a particular problem vertex in the path represents a problem that would arise as a result of the particular workaround being applied to a device.

6. The method as in claim 1, further comprising:
   causing, by the supervisory device, the workarounds represented by the plurality of workaround vertices in the path to be applied to the particular device, wherein the workarounds are applied according to an ordering of the workaround vertices in the path.

7. The method as in claim 1, wherein identifying the workaround for the symptom exhibited by the particular device further comprises:
   selecting, by the supervisory device, the path in the symptom-problem graph from among a plurality of paths in the symptom-problem graph that include the symptom vertex, based on the selected path being the shortest path among the plurality of paths.

8. The method as in claim 1, wherein identifying the workaround for the symptom exhibited by the particular device further comprises:
   selecting, by the supervisory device, the path in the symptom-problem graph from among a plurality of paths in the symptom-problem graph that include the symptom vertex, based on the selected path having a lowest associated path cost among the plurality of paths.

9. The method as in claim 1, wherein the workaround applied to the particular device comprises at least one of: disabling a particular software module on the particular device or adjusting a setting of the particular device.

10. The method as in claim 1, wherein the particular device comprises at least one of: a network switch, a network router, or a network firewall.

11. An apparatus, comprising:
   one or more network interfaces to communicate with a network;
   a processor coupled to the network interfaces and configured to execute one or more processes; and
   a memory configured to store a process executable by the processor, the process when executed configured to:
      identify a workaround for a symptom exhibited by a particular device in the network by traversing a path in a symptom-problem graph, wherein the path in the graph comprises a symptom vertex that represents the symptom, a problem vertex that shares an edge with the symptom vertex and represents a problem that causes the symptom, and a workaround vertex that shares an edge with the problem vertex and represents the workaround for the symptom;

cause the identified workaround to be applied to the particular device;

update the path in the symptom-problem graph to replace the workaround vertex with a fix vertex that represents a fix for the problem that causes the symptom exhibited by the particular device; and cause the fix for the problem to be applied to the particular device based on the updated path in the symptom-problem graph.

12. The apparatus as in claim 11, wherein the fix for the problem comprises a software update for the particular device.

13. The apparatus as in claim 11, wherein the process when executed is further configured to:

track application of the identified workaround to the particular device; and cause the workaround applied to the particular device to be rolled back based on the tracking of the application of the identified workaround to the particular device.

14. The apparatus as in claim 13, wherein the apparatus tracks the application of the identified workaround to the particular device by:

maintaining a device tree that is based on the symptom-problem tree.

15. The apparatus as in claim 11, wherein the path in the symptom-problem graph comprises a plurality of workaround and problem vertices, and wherein an edge between a particular workaround vertex and a particular problem vertex in the path represents a problem that would arise as a result of the particular workaround being applied to a device.

16. The apparatus as in claim 11, wherein the process when executed is further configured to:

cause the workarounds represented by the plurality of workaround vertices in the path to be applied to the particular device, wherein the workarounds are applied according to an ordering of the workaround vertices in the path.

17. The apparatus as in claim 11, wherein the apparatus identifies the workaround for the symptom exhibited by the particular device by:

selecting the path in the symptom-problem graph from among a plurality of paths in the symptom-problem graph that include the symptom vertex, based on the selected path being the shortest path among the plurality of paths.

18. The apparatus as in claim 11, wherein the apparatus identifies the workaround for the symptom exhibited by the particular device by:

selecting the path in the symptom-problem graph from among a plurality of paths in the symptom-problem graph that include the symptom vertex, based on the selected path having a lowest associated path cost among the plurality of paths.

19. The apparatus as in claim 11, wherein the workaround applied to the particular device comprises at least one of: disabling a particular software module on the particular device or adjusting a setting of the particular device.

20. A tangible, non-transitory, computer-readable medium storing program instructions that cause a supervisory device in a network to perform a process comprising:

identifying, by the supervisory device, a workaround for a symptom exhibited by a particular device in the network by traversing a path in a symptom-problem graph, wherein the path in the graph comprises a symptom vertex that represents the symptom, a problem vertex that shares an edge with the symptom vertex and represents a problem that causes the symptom, and a workaround vertex that shares an edge with the problem vertex and represents the workaround for the symptom;

causing, by the supervisory device, the identified workaround to be applied to the particular device;

updating, by the supervisory device, the path in the symptom-problem graph to replace the workaround vertex with a fix vertex that represents a fix for the problem that causes the symptom exhibited by the particular device; and causing, by the supervisory device, the fix for the problem to be applied to the particular device based on the updated path in the symptom-problem graph.

* * * * *

UNITED STATES PATENT AND TRADEMARK OFFICE
CERTIFICATE OF CORRECTION

PATENT NO. : 10,439,874 B2  
APPLICATION NO. : 15/620100  
DATED : October 8, 2019  
INVENTOR(S) : David C. White, Jr. et al.

Page 1 of 1

It is certified that error appears in the above-identified patent and that said Letters Patent is hereby corrected as shown below:

In the Specification

Column 11, Line 58, please amend as shown:  
$F_2$, as represented by vertex 502I, becomes available to Signed and Sealed this  
Fourteenth Day of January, 2020

Andrei Iancu  
*Director of the United States Patent and Trademark Office*